United States Patent
Lee et al.

(10) Patent No.: US 7,394,962 B2
(45) Date of Patent: Jul. 1, 2008

(54) OPTICAL WAVEGUIDE FOR TRANSMITTING SURFACE PLASMON-POLARITON WAVE

(75) Inventors: Gwan-Su Lee, Seoul (KR); Soo-Jin Jung, Suwon (KR); Dong-Ho Shin, Seoul (KR); Won-Hoe Koo, Seoul (KR); Il-Kweon Joung, Ansan (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 11/676,944

(22) Filed: Feb. 20, 2007

(65) Prior Publication Data

US 2007/0196065 A1    Aug. 23, 2007

(30) Foreign Application Priority Data

Feb. 20, 2006   (KR)   ............... 10-2006-0016309
Feb. 15, 2007   (KR)   ............... 10-2007-0016189

(51) Int. Cl.
*G02B 6/10* (2006.01)

(52) U.S. Cl. ........................................... 385/129

(58) Field of Classification Search ................ None
See application file for complete search history.

(56) References Cited

U.S. PATENT DOCUMENTS

| 6,442,321 | B1 | 8/2002 | Berini | |
| 2005/0173238 | A1* | 8/2005 | Geyer | ............. 204/192.12 |

FOREIGN PATENT DOCUMENTS

| JP | 63-191107 A | * | 8/1988 |
| JP | 5-150128 A | * | 6/1993 |

* cited by examiner

*Primary Examiner*—Sung Pak
*Assistant Examiner*—Mike Stahl
(74) *Attorney, Agent, or Firm*—Lowe Hauptman Ham & Berner

(57) ABSTRACT

An optical waveguide for transmitting a surface plasmon-polariton wave includes a metallic thin film formed to have a triangle-shaped cross-section; and a pair of first and second dielectric layers coupled to each other such that the opposing surfaces thereof come in contact with each other, with the metallic thin film interposed therebetween, the first and second dielectric layers having a different refractive index and a positive or negative dielectric constant.

12 Claims, 3 Drawing Sheets

[FIG. 1]
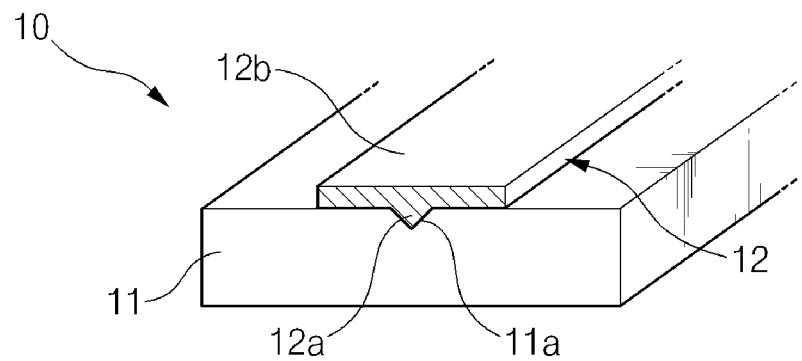
[FIG. 2]
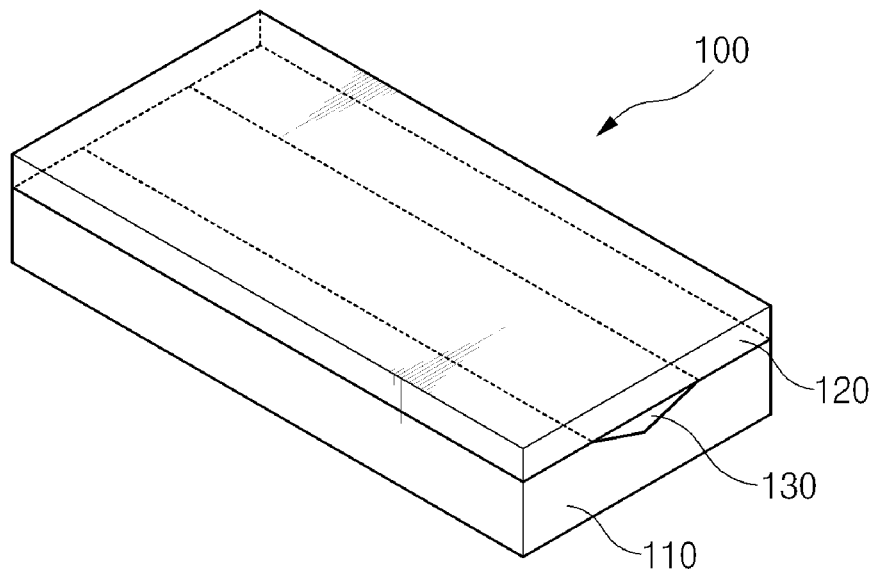
[FIG. 3]
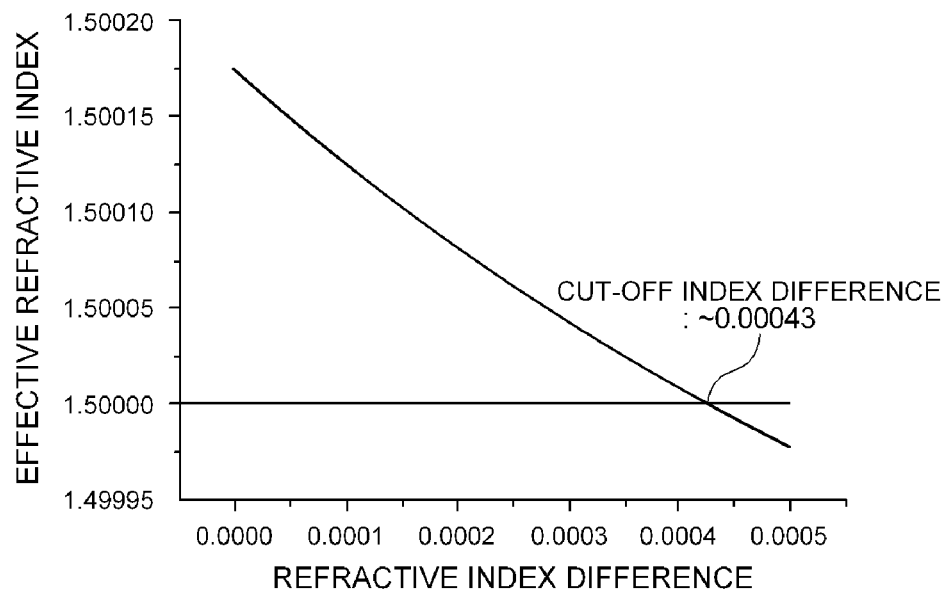

[FIG. 4]
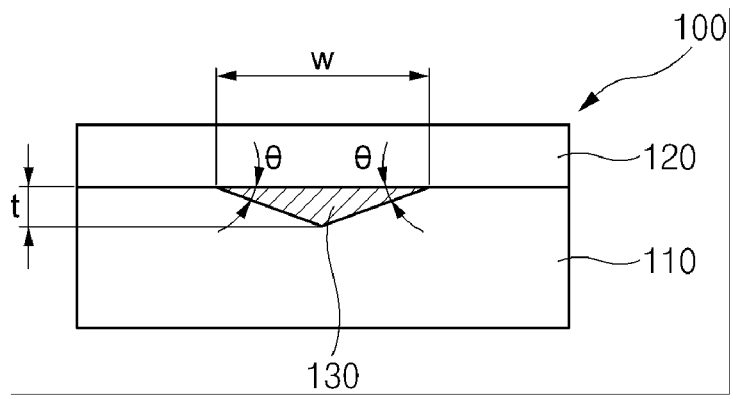
[FIG. 5]
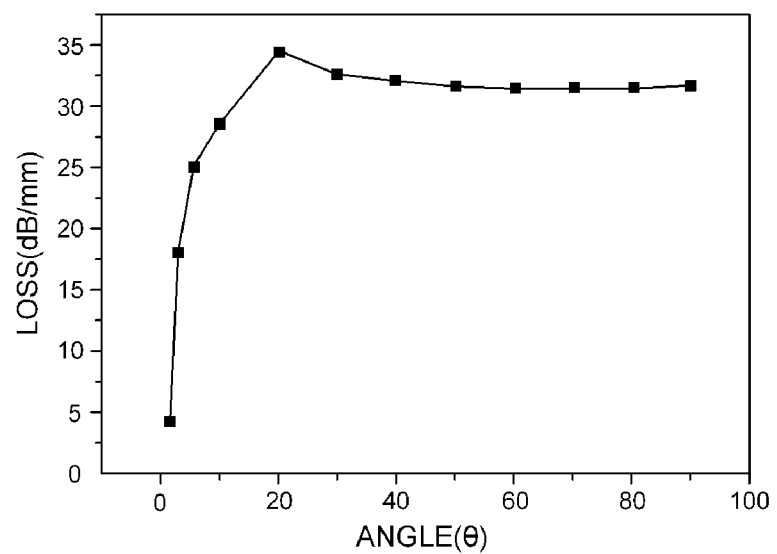
[FIG. 6]
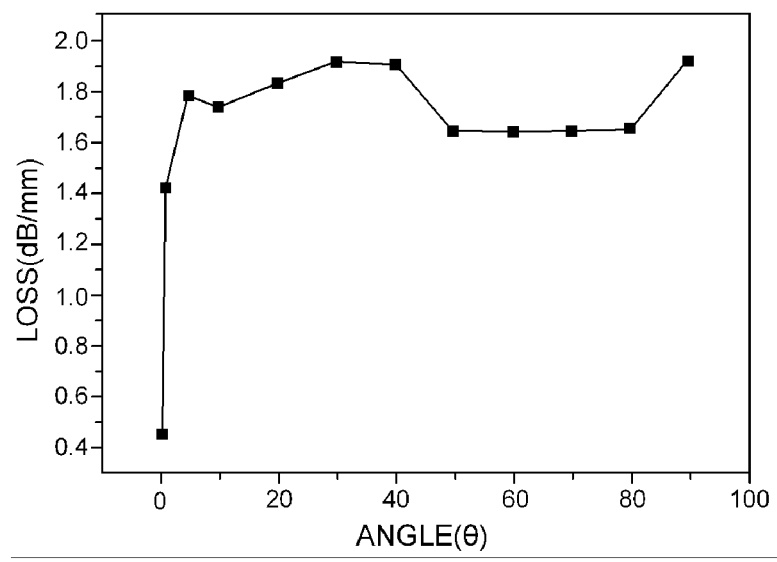

[FIG. 7]
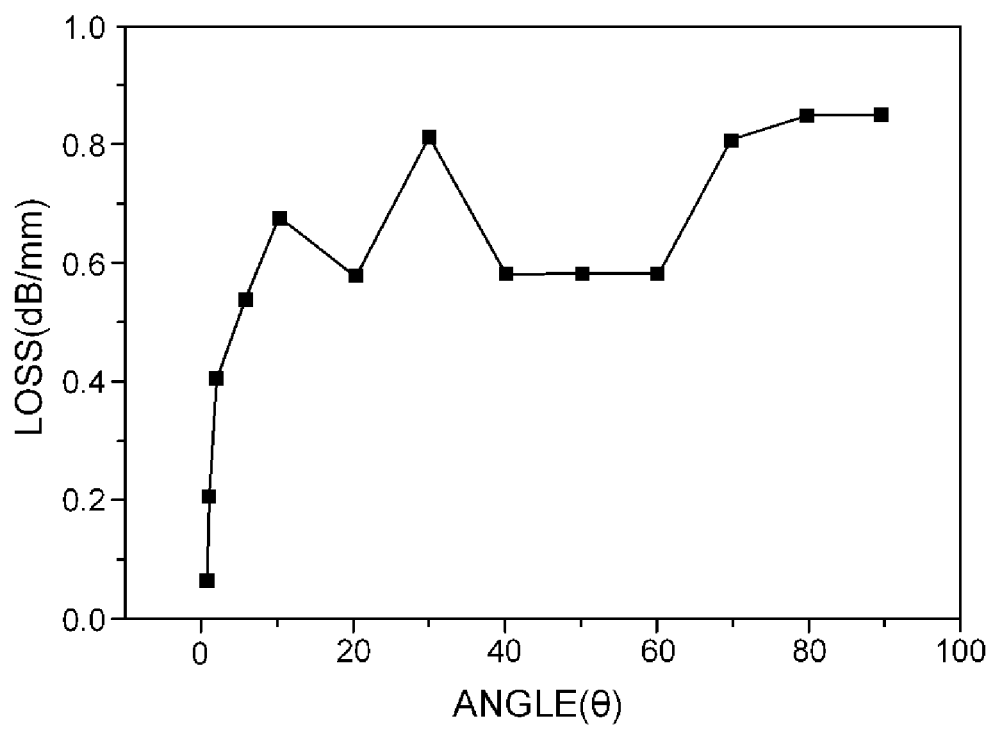
[FIG. 8]
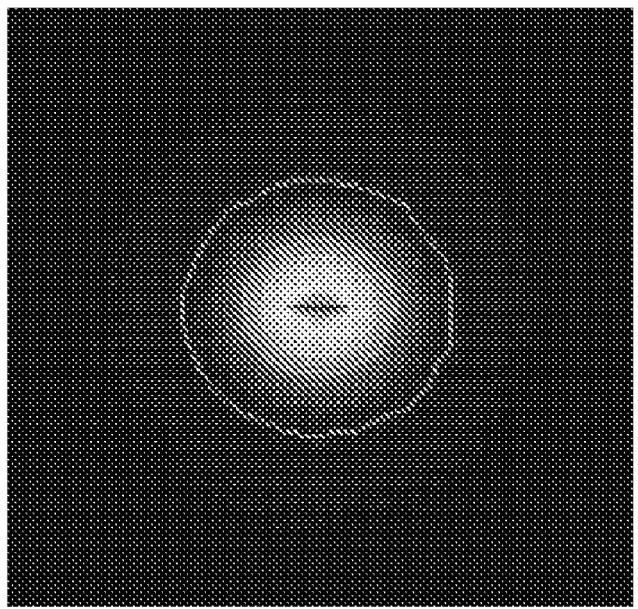

OPTICAL WAVEGUIDE FOR TRANSMITTING SURFACE PLASMON-POLARITON WAVE

CROSS-REFERENCE TO RELATED APPLICATIONS

This application claims the benefits of Korean Patent Application Nos. 10-2006-0016309 and 10-2007-0016189 filed with the Korean Intellectual Property Office on Feb. 20, 2006 and Feb. 15, 2007, the disclosures of which are incorporated herein by reference.

BACKGROUND OF THE INVENTION

1. Field of the Invention

The present invention relates to an optical waveguide for transmitting a surface plasmon-polariton wave. In the optical waveguide, a thin metallic film in which a surface plasmon-polariton wave is transmitted is formed to have a triangle-shaped cross-section, and a pair of dielectric layers interposing the metallic thin film are coupled to each other such that the opposing surfaces thereof come in contact with each other, the dielectric layers having a different refractive index. Such a structure allows a light-transmission distance to be enlarged.

2. Description of the Related Art

A surface plasmon is an oscillating wave which propagates along an interface between materials with dielectric constants having a reverse sign. In general, a surface plasmon exists at the interface between metal having the negative sign and a dielectric having the positive sign, and can be excited by electrons accelerated at high speed and light waves. An electromagnetic wave which is coupled to the surface plasmon so as to propagate is referred to as a surface plasmon-polarion (hereinafter, referred to as "SPP") wave.

Since the wave vector of the surface plasmon is larger than those of peripheral materials, the SPP wave is bound to a metal surface. Therefore, it can be considered that the interface between metal and a dielectric is a two-dimensional optical waveguide with a vertical binding condition.

In view of the optical waveguide, a SPP wave to be generated at the interface between a metallic thin film and a dielectric is effectively bound, while a propagation distance is as short as dozens of μm in a visible-ray region. However, when the thickness of the metallic thin film is limited to several nm to dozens of nm such that a SPP wave propagating at the interface is coupled to the metallic thin film, long-range transmission of light can be realized. This is referred to as a long-range surface plasmon polariton (LR-SPP) mode. The field profile of the LR-SPP mode is widely distributed in the dielectric around the metallic thin film. Therefore, a propagation loss of light is small, and a coupling characteristic with optical fiber is excellent. Accordingly, the LR-SPP mode is applied to various optical-element fields.

In general, an SPP optical waveguide in which a metallic thin film is interposed is operated at the LR-SPP mode or an SR-SPP (short range surface plasmon-polariton) mode. In the LR-SPP mode, the metallic thin film is formed to have a thickness of less than dozens of nm such that light is propagated by a long distance. In the SR-SPP mode, light is propagated through a waveguide having a relatively small size.

When a metallic thin film having a finite cross-sectional area is used, a binding condition of SPP can be reduced into the three dimension, and an LR-SPP waveguide performing a similar action to a dielectric waveguide can be formed.

Therefore, the electric field of the LR-SPP is widely distributed in the dielectric around the metallic thin film such that the LR-SPP sensitively reacts to an optical change of the peripheral dielectric. Therefore, a long-distance transmission can be realized, and the LR-SPP is currently applied to an optical waveguide element which is used in optical modulators, switches, couplers, filters, and optical sensors.

The technical construction of the conventional optical waveguide for transmitting an SPP wave is disclosed in Japanese Unexamined Patent Application Publication No. 2005-114768. The structure thereof will be briefly examined, and the problems thereof will be described as follows.

FIG. 1 is a perspective view of the conventional optical waveguide for transmitting an SPP wave. As shown in FIG. 1, the optical wave guide 10 includes a dielectric substrate 11 having a positive dielectric constant and a metallic strip structure 12 formed on the surface of the dielectric substrate 11, the metallic strip structure 12 having a negative dielectric constant. As the diameter of light is reduced through the strip structure 12, the optical waveguide has a transmission distance of several to dozens of μm.

In the optical waveguide 10, a V-shaped groove 11a is formed on the surface of the substrate 11 by an ion-milling or dry-etching process. A metallic material is filled in the V-shaped groove 11a by a sputtering method. Then, a wide-range strip is formed on the surface of the substrate 11 including the upper surface of the metallic material filled in the V-shaped groove 11 such that the strip structure 12 having a metal layer 12a and a strip 12b integrated therein is formed, the metal layer 12a having a triangle-shaped cross-section.

In this case, the metal layer 12a having a triangle-shaped cross-section may be formed so as to be exposed to the upper portion of the strip 12b.

In such a structure, an electric field is concentrated in the metallic layer 12a having a triangle-shaped surface. Therefore, as the diameter of light to be propagated along the strip 12b can be narrowed, the diameter of the light can be bound to less than 200 nm. Further, a transmission distance of about 10 μm, which is approximate to a transmission distance of surface plasmon-polariton wave in the metallic thin film, can be achieved.

In the conventional optical waveguide for transmitting an SPP wave, however, since an electric field is concentrated in the metal layer 12a having a triangle-shape cross-section, a transmission distance thereof is no more than dozens of μm at most, even though the diameter of light is limited to less than 200 nm. Therefore, there are difficulties in using the optical waveguide structure as a sensing element which is applied to optical modulators, switches, couplers, filters and optical sensors.

SUMMARY OF THE INVENTION

An advantage of the present invention is that it provides an optical waveguide for transmitting a surface plasmon-polariton wave. In the optical waveguide, a thin metallic film in which a surface plasmon-polariton wave is transmitted is formed to have a triangle-shaped cross-section, and a pair of dielectric layers interposing the metallic thin film are coupled to each other such that the opposing surfaces thereof come in contact with each other, the dielectric layers having a different refractive index and a different dielectric constant. Such a structure minimizes a propagation loss of light to be propagated through the optical waveguide, thereby enlarging a transmission distance of light.

Additional aspect and advantages of the present general inventive concept will be set forth in part in the description which follows and, in part, will be obvious from the description, or may be learned by practice of the general inventive concept.

According to an aspect of the invention, an optical waveguide for transmitting a surface plasmon-polariton wave comprises a metallic thin film formed to have a triangle-shaped cross-section; and a pair of first and second dielectric layers coupled to each other such that the opposing surfaces thereof come in contact with each other, with the metallic thin film interposed therebetween, the first and second dielectric layers having a different refractive index and a positive or negative dielectric constant.

According to another aspect of the invention, light incident on one end of the metallic thin film is transmitted along the surface of the metallic thin film at a SPP (surface plasmon-polariton) mode.

According to a further aspect of the invention, one end of the metallic thin film such that light is coupled to a light delivering unit through which light is incident, the metallic thin film being formed of a material with a high charge density.

According to a still further aspect of the invention, the metallic thin film is formed of gold (Au), silver (Ag), or an alloy of gold or silver, or has a plated layer in which gold and silver are sequentially plated.

According to a still further aspect of the invention, the metallic thin film is formed to have an isosceles-triangle-shaped cross-section.

According to a still further aspect of the invention, the metallic thin film is formed to have an isosceles-triangle-shaped cross-section in which interior angles facing each other are more than 0 degree and are as small as possible.

According to a still further aspect of the invention, the first and second dielectric layers have different refractive indexes, and the refractive indexes and positive and negative dielectric constants thereof are variable as the thicknesses of the first and second dielectric layers are changed.

According to a still further aspect of the invention, the dielectric layers have the same refractive index.

According to a still further aspect of the invention, the dielectric layers are formed of an inorganic material having a relatively low charge density, such as silicon, glass, or polymer-based resin.

According to a still further aspect of the invention, a refractive index difference between the first and second dielectric layers is maintained at less than 0.00043.

According to a still further aspect of the invention, after the metallic thin film is laminated on the first dielectric layer, the first and second dielectric layers are integrated by a baking process, the first and second dielectric layers having the same or a different refractive index.

According to a still further aspect of the invention, the distribution of light to be emitted from the metallic thin film is formed in a substantially circular shape.

According to a still further aspect of the invention, the metallic thin film is formed to have an isosceles-triangle-shaped cross-section, close to a plane, in which the interior angles facing each other are extremely small with respect to a width thereof.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a perspective view of a conventional optical waveguide for transmitting an SPP wave;

FIG. 2 is a perspective view illustrating an optical waveguide according to the invention;

FIG. 3 is a graph showing a refractive index of a dielectric which is applied to the optical waveguide according to the invention;

FIG. 4 is a sectional view of the optical waveguide according to the invention;

FIGS. 5 to 7 are graphs showing propagation losses in accordance with a change in interior angle of a metallic thin film for each wavelength, FIG. 5 showing a case where light with a wavelength of 633 nm is used, FIG. 6 showing a case where light with a wavelength of 980 nm is used, and FIG. 7 showing a case where light with a wavelength of 1550 nm is used; and FIG. 8 is a photograph showing the distribution of light to be propagated through the optical waveguide according to the invention.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, an optical waveguide for transmitting a surface plasmon-polariton wave according to an embodiment of the present invention will be described in detail with reference to the accompanying drawings.

FIG. 2 is a perspective view illustrating an optical waveguide according to the invention, FIG. 3 is a graph showing a refractive index of a dielectric which is applied to the optical waveguide according to the invention, and FIG. 4 is a sectional view of the optical waveguide according to the invention.

As shown in FIG. 2, the optical waveguide 100 for transmitting a surface plasmon-polariton wave includes a first dielectric layer 110 having a positive dielectric constant, a second dielectric layer 120 having a negative dielectric constant, and a metallic thin film 130 interposed therebetween.

The first and second dielectric layers 110 and 120 are coupled to each other such that the opposing surfaces thereof come in contact with each other. That is, the first and second dielectric layers 110 and 120 are formed to cover the upper and lower surfaces of the metallic thin film 130 having a negative dielectric constant.

The first and second dielectric layers 110 and 120 are respectively formed of materials having a different dielectric constant and refractive index. Preferably, the first and second dielectric layer 110 and 120 are formed of an inorganic material such as silicon, glass, or polymer-based resin having a relatively low charge density.

Further, the first and second dielectric layers 110 and 120 may be formed of ceramic sheets having the same refractive index. The metallic thin film 103 is laminated on the first dielectric layer 110. Then, the first and second dielectric layers 110 and 120 having the same or a different refractive index are integrated by a baking process.

In this case, a difference in refractive index between the first and second dielectric layers 110 and 120 should be maintained at less than 0.00043, as shown in FIG. 3. While the thickness of the second dielectric layer 120 coupled to the upper surface of the first dielectric layer 120 is changed in a state where the thickness of the first dielectric layer 110 serving as a substrate is fixed, a refractive index thereof varies so that a difference in refractive index between the first and second dielectric layers 110 and 120 approaches a cut-off index difference of 0.00043.

When the cut-off index difference is equal to or more than 0.00043, light to be transmitted along the metallic film 130 is leaked through two of the dielectric layers 110 and 120. Then, light to be transmitted along the metallic thin film 130 cannot be guided, which makes it impossible to manufacture an optical waveguide 100 having a predetermined transmission distance.

In a typical optical waveguide, an effective refractive index to be extracted in a state where the metallic thin film 130 serving as a core is combined with claddings surrounding the metallic thin film 130, that is, the first and second dielectric layers 110 and 120, is required to be larger than an effective refractive index to be obtained in the dielectric layers 110 and 120 outside the metallic thin film 130.

The optical waveguide 100 has such a property that light to be transmitted along the metallic thin film 130 tends to be distributed in the dielectric layer having a high refractive index at the LR-SPP mode. Therefore, an amount of light existing in the metallic thin film 130 is reduced, thereby reducing a propagation loss of light through the metallic thin film 130 at the LR-SPP mode.

In other words, an amount of light existing inside the metallic thin film 130 surrounded by the first and second dielectric layers 110 and 120 is reduced due to such a property that light to be propagated along the metallic thin film 130 tends to be distributed in the dielectric layers 110 and 120 having a higher effective refractive index. Therefore, a propagation loss is reduced, which is caused by the dispersion of light to be transmitted through the metallic thin film 130.

On the contrary, when the metallic thin film 130 disposed between the first and second dielectric layers 110 and 120 has a high refractive index, light on the metallic thin film 130 is not emitted outside but is concentrated in the metallic thin film 130. As a result, light is concentrated around the metallic thin film 130 such that a propagation loss increases.

Such a property that light to be propagated through the metallic thin film 130 is integrated into a small size can be applied to other fields.

In this embodiment, the effective refractive indexes of the first and second dielectric layers 110 and 120 surrounding the metallic thin film 130 are set to 1.500, as shown in FIG. 3. FIG. 3 shows the transition of effective refractive index in accordance with a difference in refractive index between the dielectric layers 110 and 120 by reference to the effective refractive index of 1.500, the difference in refractive index occurring when the refractive indexes of the first and second dielectric layers 110 and 120 are changed.

In FIG. 3, it can be found that, as a difference in refractive index between the first and second dielectric layers 110 and 120 increases, the refractive index of any one of the first and second dielectric layers 110 and 120 becomes much more smaller that that of the other, and simultaneously, the effective refractive index of the metallic thin film 130 decreases.

When the effective refractive index of the metallic thin film 130 decreases to the effective refractive index of 1.500 which is previously set as the effective refractive index of the first and second dielectric layers 110 and 120, a refractive index difference between the first and second dielectric layers 110 and 120 is 0.00043.

Therefore, in order to induce light, emitted through the metallic thin film 130, toward a material having a higher refractive index such that a propagation loss is reduced, a refractive index difference between the first and second dielectric layers 110 and 120 should be maintained at less than 0.00043.

The metallic thin film 130 has a triangle-shaped cross-section with a finite length and a limited width W and height t. Further, the metallic thin film 130 is formed of a metallic material having a relatively high charge density.

The metallic thin film 130 is formed of gold (Au), silver (Ag), or an alloy of gold or silver, or has a plated layer in which gold and silver are sequentially plated. One end of the metallic thin film 130 is connected to a light delivering unit (not shown) through which light is incident. As for the light delivering unit, optical fiber can be exemplified.

In this embodiment, a propagation loss of light through the optical waveguide 100 and a transmission distance have been measured under such a condition that the refractive index difference between the first and second dielectric layers 110 and 120 is maintained at less than 0.00043. In this case, interior angles θ facing each other, that is, angles between the equal sides and the base in the triangle-shaped cross-section are changed in the range of 0 to 90 degrees, and the width W and the height t are limited to predetermined values for each of representative wavelengths (633 nm, 980 nm, and 1550 nm) of light to be transferred through the metallic thin film 130.

FIGS. 5 to 7 are graphs showing propagation losses in accordance with a change in interior angle of the metallic thin film for each wavelength. FIG. 5 shows a case where light with a wavelength of 633 nm is used, FIG. 6 shows a case where light with a wavelength of 980 nm is used, and FIG. 7 shows a case where light with a wavelength of 1550 nm is used.

The optical waveguide 100 to which light having a wavelength of 633 nm is transmitted has the metallic thin film 130 interposed between the first and second dielectric layers 110 and 120, the metallic thin film 130 having a cross-section with a predetermined width W and a height t. The height t can be changed depending on the magnitude of interior angles θ facing each other. Through the optical fiber connected to the one end of the metallic thin film 130, a surface plasmon polariton wave having a wavelength of 633 nm is transmitted.

At this time, as the interior angles θ facing each other are changed in the range of 0 to 90 degrees in a state where the width W is limited to about 1 μm, the metallic thin film 130 has an isosceles-triangle-shaped cross-section formed in an extremely thin shape in the vicinity of an interior angle of 0 degree. Further, the metallic thin film has a cross-section formed in a substantially rectangular shape in the vicinity of an interior angle of 90 degrees.

In the case of the light with a wavelength of 633 nm, when the interior angles θ facing each other are about 20 degrees, the maximum propagation loss of light occurs, as shown in FIG. 5. Further, as the magnitude of the interior angle θ decreases, a propagation loss of light becomes small. Therefore, when the metallic thin film 130 has an isosceles-triangle-shaped cross-section in which the interior angles θ facing each other are more than 0 degree and are as small as possible, a propagation loss is minimized.

The optical waveguide 100 to which light with a wavelength of 980 nm is transmitted has the metallic thin film 130 interposed between the first and second metallic thin films 110 and 120, the metallic thin film 130 having a cross-section with a predetermined width W and a height t. The height t can be changed depending on the magnitude of interior angles θ facing each other. Through the optical fiber connected to the one end of the metallic thin film 130, a surface plasmon polariton wave having a wavelength of 980 nm is transmitted.

At this time, while the interior angles θ facing each other are changed in the range of 0 to 90 degrees, a large propagation loss starts to occur at an angle of about five degrees, as shown in FIG. 6.

Therefore, in order to minimize a propagation loss such that a transmission distance can be lengthened, it is preferable that the metallic thin film 130 is formed to have an isosceles-triangle-shaped cross-section in which the interior angles θ facing each other are more than 0 degree and are as small as possible.

Next, the metallic thin film 130 is interposed between the first and second dielectric layers 110 and 120, the metallic thin film 130 having a cross-section with a predetermined width W and a height t. The height t can be changed depending on the magnitude of interior angles θ facing each other. Through the optical fiber connected to the one end of the metallic thin film 130, a surface plasmon polariton wave having a wavelength of 1550 nm is transmitted.

At this time, while the interior angles θ facing each other are changed in the range of 0 to 90 degrees, a large propagation loss starts to occur at an angle of about 10 degrees.

Even in this case, when the metallic thin film 130 is formed to have an isosceles-triangle-shaped cross-section in which the interior angles facing each other are more than 0 degree and are as small as possible, a propagation loss of light is minimized, and the maximum light-transmission distance is measured.

As described above, the metallic thin film 130 of the optical waveguide 100 to which lights at three wavelengths are transmitted is inevitably formed to have an extremely small height t (nm), compared with a width W (μm). Practically, the metallic thin film 130 is formed to have an isosceles-triangle-shaped cross-section, close to a plane, in which the interior angles θ facing each other are extremely small with respect to the width W.

Table 1 shows propagation losses and light-transmission distances which are measured for wavelengths applied to the optical waveguide of the invention by using the metallic thin film 130 having a limited size.

TABLE 1

| Wavelength (nm) | Size (W × t) | Propagation loss (dB/mm) | Transmission distance (mm) |
|---|---|---|---|
| 633 | 1 μm × 15 nm | 4.24 | 1.89 |
| 980 | 4 μm × 16 nm | 0.45 | 17.78 |
| 1550 | 4 μm × 24.4 nm | 0.06 | 133.3 |

As seen in Table 1, the maximum transmission distance for the wavelength of 633 nm is 1.89 mm, the maximum transmission distance for the wavelength of 980 nm is 17.78 mm, and the maximum transmission distance for the wavelength of 1550 nm is 133.3 mm.

Such transmission distances are sufficient for manufacturing an optical waveguide which can be applied to sensors, optical modulators, switches, and the like. It can be found that the transmission distance is enlarged several hundred times in comparison with that of the conventional optical waveguide.

FIG. 8 is a photograph showing the distribution of light to be propagated along the metallic thin film 130, when light with a specific wavelength (633 nm, 980 nm, or 1550 nm) is transmitted through the metallic thin film 130 which is formed to have an isosceles-triangle-shaped cross-section close to a plane.

As shown in FIG. 8, since the distribution of light which is obtained through the optical waveguide according to the invention is formed in a substantially circuit shape, the distribution of light is very similar to the shape of the light distribution of the optical fiber connected to one end of the optical waveguide. Therefore, the optical fiber can be easily coupled, so that a resulting loss caused by the coupling can be minimized.

As described above, in the optical waveguide for transmitting a surface plasmon-polariton wave according to the invention, the metallic thin film having a triangle-shaped cross-section is interposed between the pair of dielectric layers which are coupled to each other such that the opposing surfaces thereof come in contact with each other, the dielectric layers having a different refractive index and dielectric constant. Therefore, a propagation loss of light to be propagated through the optical wave-guide is minimized so that a transmission distance of the light can be enlarged for all the wavelengths. Further, the distribution of light is formed in a substantially circular shape such that a loss caused by the coupling with the optical fiber connected to one end of the metallic thin film can be reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An optical waveguide for transmitting a surface plasmon-polariton wave comprising:
    a metallic thin film formed to have a triangle-shaped cross-section; and
    a pair of first and second dielectric layers coupled to each other such that the opposing surfaces thereof come in contact with each other, with the metallic thin film interposed therebetween, the first and second dielectric layers having a different refractive index and a positive or negative dielectric constant;
    wherein one end of the metallic thin film is coupled to a light delivering unit through which light is incident, the metallic thin film being formed of a material with a high charge density.

2. The optical waveguide according to claim 1, wherein light incident on one end of the metallic thin film is transmitted along the surface of the metallic thin film in a SPP (surface plasmon-polariton) mode.

3. The optical waveguide according to claim 1, wherein the metallic thin film is formed of gold (Au), silver (Ag), or an alloy of gold and silver, or has a plated layer in which gold and silver are sequentially plated.

4. The optical waveguide according to claim 1, wherein the metallic thin film has an isosceles-triangle-shaped cross-section.

5. The optical waveguide according to claim 1, wherein the metallic thin film has an isosceles-triangle-shaped cross-section in which interior angles facing each other are more than 0 degree and are as small as possible.

6. The optical waveguide according to claim 1, wherein the first and second dielectric layers have different refractive indexes, and the refractive indexes and the positive and negative dielectric constants of the first and second dielectric layers are variable as the thicknesses of the first and second dielectric layers are changed.

7. The optical waveguide according to claim 1, wherein the dielectric layers are formed of an inorganic material having a lower charge density than the metallic thin film, said inorganic material being at least one of silicon, glass, and polymer-based resin.

8. The optical waveguide according to claim 6, wherein a refractive index difference between the first and second dielectric layers is maintained at less than 0.00043.

9. The optical waveguide according to claim 1, wherein after the metallic thin film is laminated on the first dielectric layer, the first and second dielectric layers are integrated by a baking process.

10. The optical waveguide according to claim 1, wherein the distribution of light to be emitted from the metallic thin film is formed in a substantially circular shape.

11. An optical waveguide for transmitting a surface plasmon-polariton wave comprising:
 a metallic thin film formed to have a triangle-shaped cross-section; and
 a pair of first and second dielectric layers coupled to each other such that the opposing surfaces thereof come in contact with each other, with the metallic thin film interposed therebetween, the first and second dielectric layers having a different refractive index and a positive or negative dielectric constant;
 wherein the metallic thin film has an isosceles-triangle-shaped cross-section.

12. An optical waveguide for transmitting a surface plasmon-polariton wave comprising:
 a metallic thin film formed to have a triangle-shaped cross-section; and
 a pair of first and second dielectric layers coupled to each other such that the opposing surfaces thereof come in contact with each other, with the metallic thin film interposed therebetween, the first and second dielectric layers having a different refractive index and a positive or negative dielectric constant;
 wherein the first and second dielectric layers have different refractive indexes, and the refractive indexes and the positive and negative dielectric constants of the first and second dielectric layers are variable as the thicknesses of the first and second dielectric layers are changed; and
 wherein a refractive index difference between the first and second dielectric layers is maintained at less than 0.00043.

* * * * *